(12) United States Patent
Chiang

(10) Patent No.: US 6,305,243 B1
(45) Date of Patent: Oct. 23, 2001

(54) BICYCLE CRANK ARM

(76) Inventor: Douglas Chiang, 487, Ko-Chung Rd., Ta-Li City, Taichung Hsien (TW)

( * ) Notice: Subject to any disclaimer, the term of this patent is extended or adjusted under 35 U.S.C. 154(b) by 0 days.

(21) Appl. No.: 09/497,527

(22) Filed: Feb. 4, 2000

(51) Int. Cl.[7] .................................................. G05G 1/14
(52) U.S. Cl. ........................................... 74/594.1; 280/259
(58) Field of Search ................................ 74/594.1–594.3, 74/558.5, 608, 609, 612; 474/151, 144; 280/259, 260

(56) References Cited

U.S. PATENT DOCUMENTS

| 867,668 | * | 10/1907 | Miller | 74/594.1 |
|---|---|---|---|---|
| 2,350,468 | * | 6/1944 | Kraeft | 74/594.1 |
| 3,648,542 | * | 3/1972 | Perotti et al. | 74/594.1 |
| 5,010,785 | * | 4/1991 | Romero | 74/594.1 |
| 5,609,070 | * | 3/1997 | Lin et al. | 74/594.1 |
| 5,941,135 | * | 8/1999 | Schlanger | 74/594.1 |

FOREIGN PATENT DOCUMENTS

| 270388 A | * | 11/1910 | (EP) | 74/594.1 |
|---|---|---|---|---|
| 417313 | * | 11/1910 | (FR) | 74/594.1 |
| 16499 | * | of 1897 | (GB) | 74/594.1 |
| 22058 | * | of 1901 | (GB) | 74/594.1 |

* cited by examiner

Primary Examiner—David A. Bucci
Assistant Examiner—Chong H. Kim
(74) Attorney, Agent, or Firm—Bacon & Thomas PLLC

(57) ABSTRACT

A bicycle crank arm. The crank arm includes a main body, an axle fastening member fastened with one end of the main body, a pedal fastening member fastened with other end of the main body, and a cover body of a carbon fiber material for embedding the main body, the axle fastening member and the pedal fastening member. The main body is provided at one end thereof with a first male threaded portion, and at other end thereof with a second male threaded portion. The axle fastening member is provided with a female threaded portion, which is engaged with the first male threaded portion of the main body. The pedal fastening member is provided with a female threaded portion, which is engaged with the second male threaded portion of the main body. The axle fastening member and the pedal fastening member are provided in the external surface thereof with a plurality of protrusions, which are anchored in the cover body.

1 Claim, 5 Drawing Sheets

BICYCLE CRANK ARM

FIELD OF THE INVENTION

The present invention relates generally to a bicycle, and more particularly to a crank arm of the bicycle.

BACKGROUND OF THE INVENTION

This inventor of the present invention discloses in the U.S. Pat. No. 5,979,923 a bicycle crank arm which is enclosed in a body of carbon fiber, as shown in FIG. 1. The bicycle crank arm is light in weight and strong in structural strength, nevertheless the device can be improved further.

SUMMARY OF THE INVENTION

The primary objective of the present invention is to provide a bicycle crank arm which is better than the prior art bicycle crank arm described above in terms of quality and manufacturing economy.

In keeping with the principle of the present invention, the foregoing objective of the present invention is attained by a bicycle crank arm comprising a main body, an axle fastening member, and a pedal fastening member. The main body is provided at both ends thereof with a male threaded portion. The axle fastening member and the pedal fastening member are respectively provided with a female threaded portion engageable with the male threaded portions of the main body. The axle fastening member and the pedal fastening member are provided in the external surface thereof with a plurality of protrusions which are intended to fix with a body which is made of carbon fiber and is used to enclose the main body, the axle fastening member, and the pedal fastening member.

The foregoing objective, features and functions of the present invention will be more readily understood upon a thoughtful deliberation of the following detailed description of a preferred embodiment of the present invention with reference to the accompanying drawings.

DETAILED DESCRIPTION OF THE PREFERRED EMBODIMENT

Figure 1:
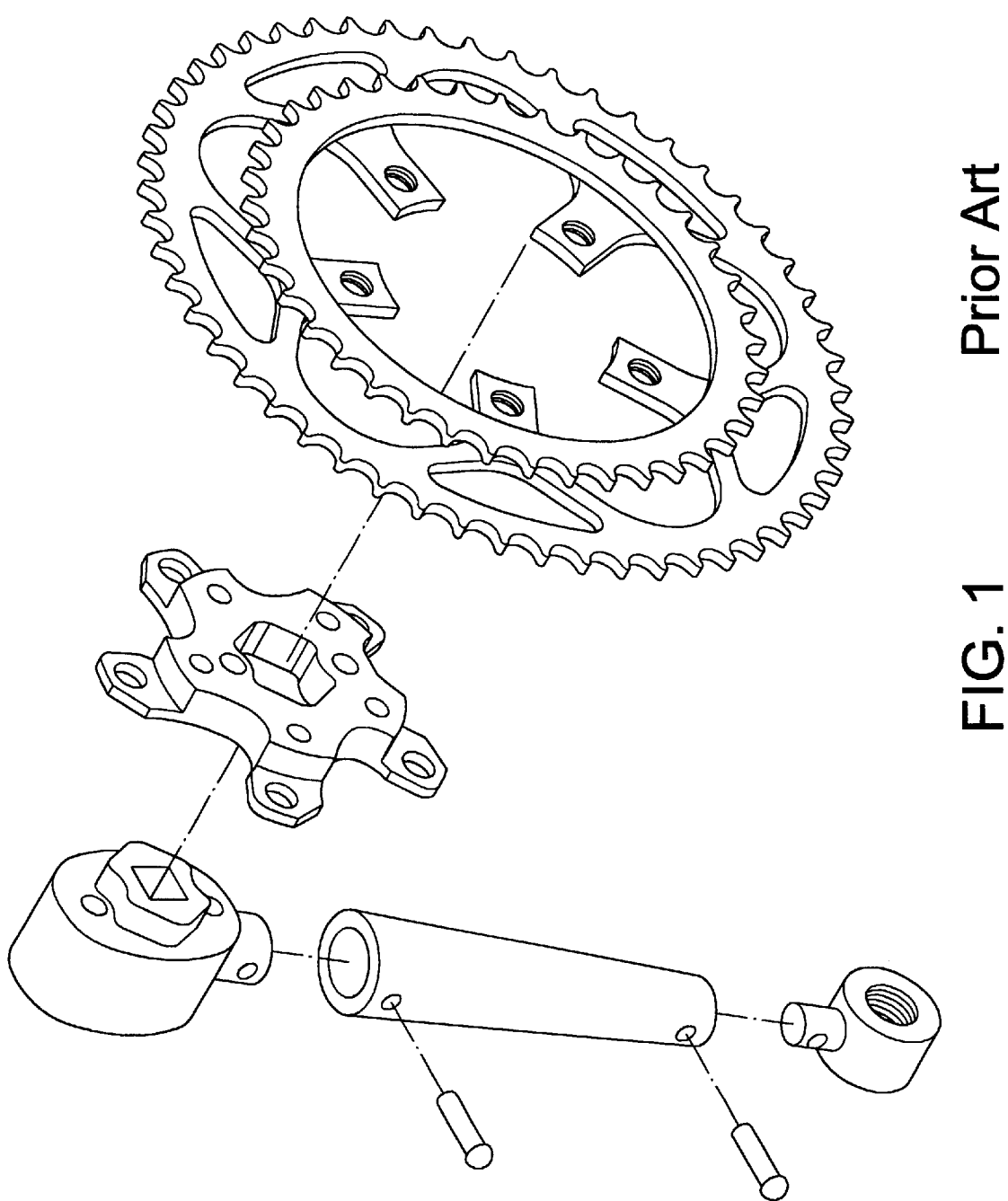
FIG. 1 shows an exploded view of a bicycle crank arm disclosed in the prior art (U.S. Pat. No. 5,979,923).
Figure 2:
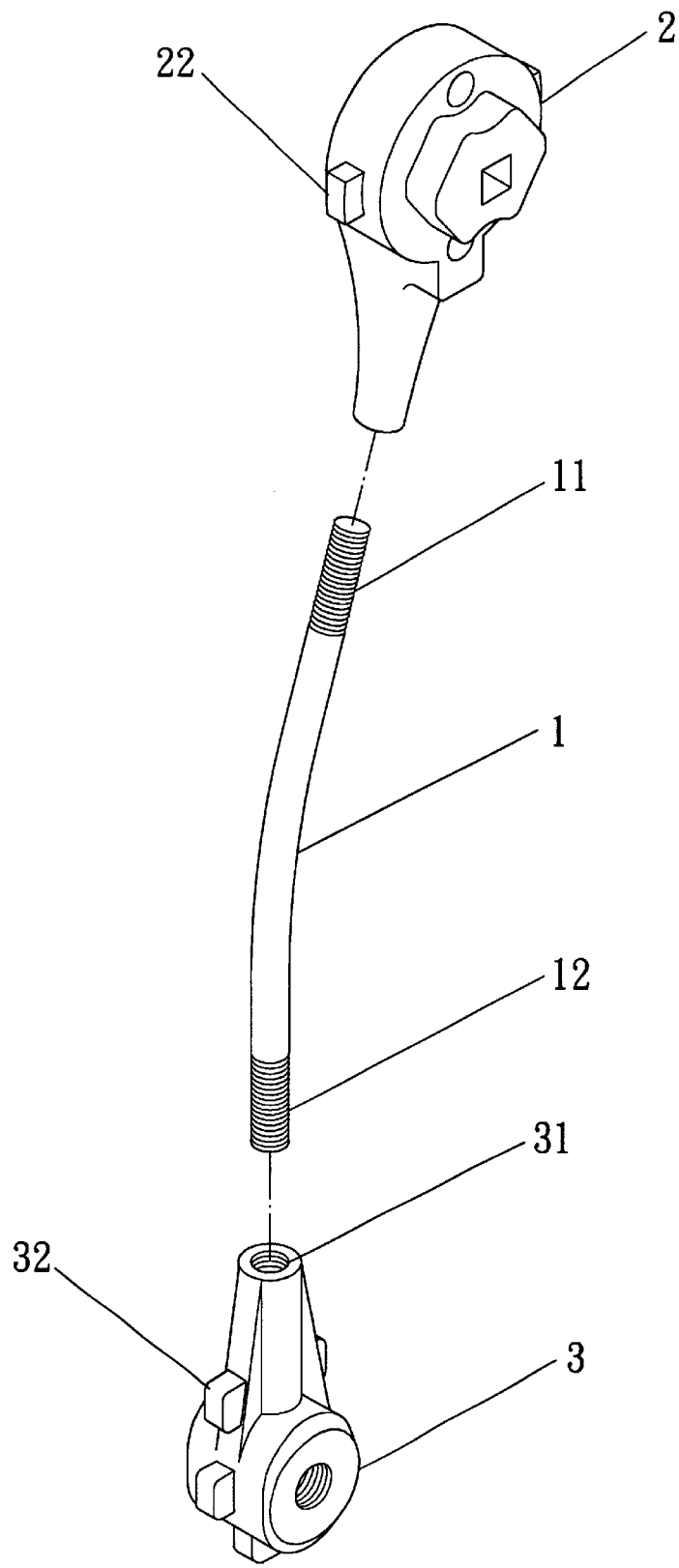
FIG. 2 shows an exploded view of the preferred embodiment of the present invention.
Figure 3B:
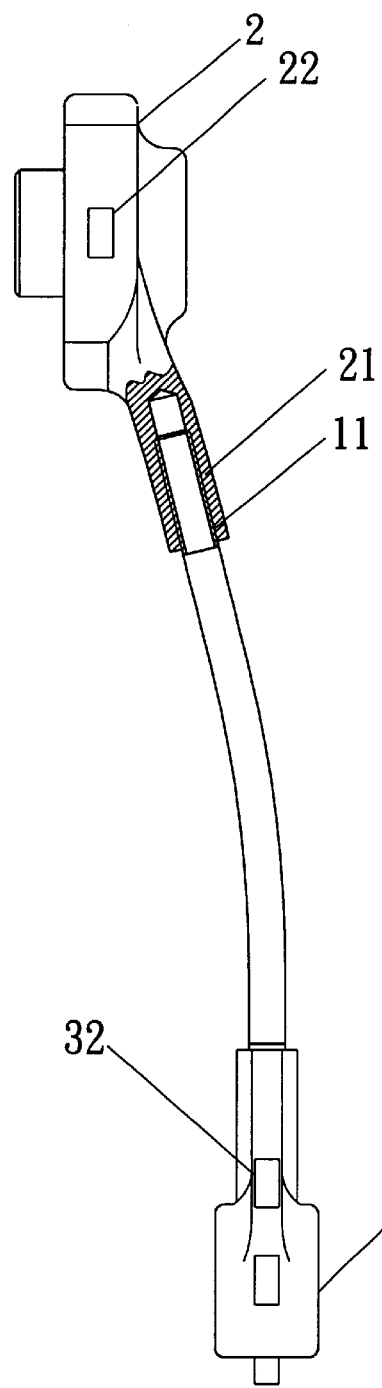
FIG. 3B shows a side view, partially in section, of the preferred embodiment of the present invention of FIG. 3A.
Figure 3A:
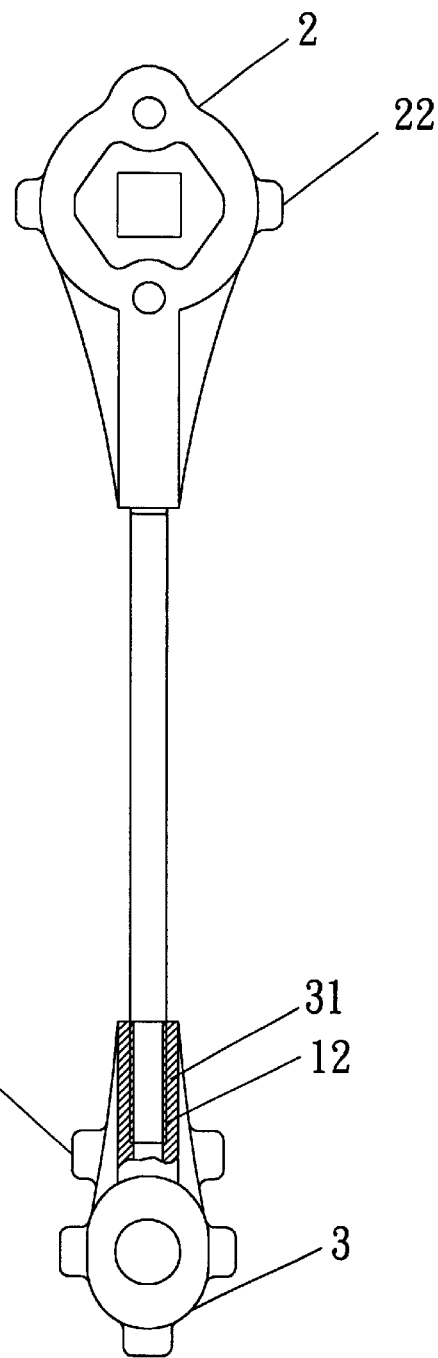
FIG. 3A shows a front view, partially in section, of the preferred embodiment of the present invention upon assembly.
Figure 4:
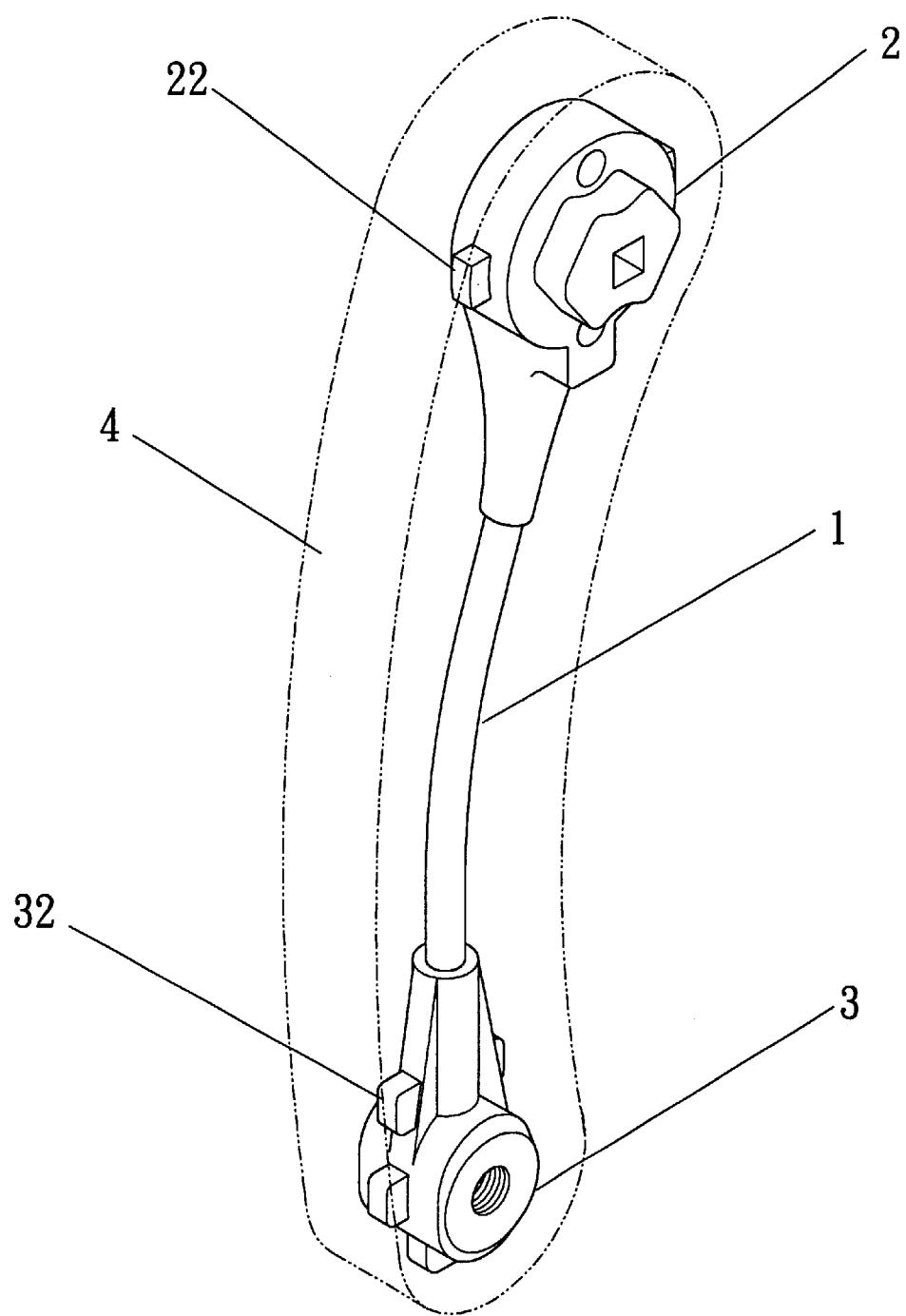
FIG. 4 shows a perspective view of the preferred embodiment of the present invention of FIG. 3A covered by a covered body.
Figure 5:
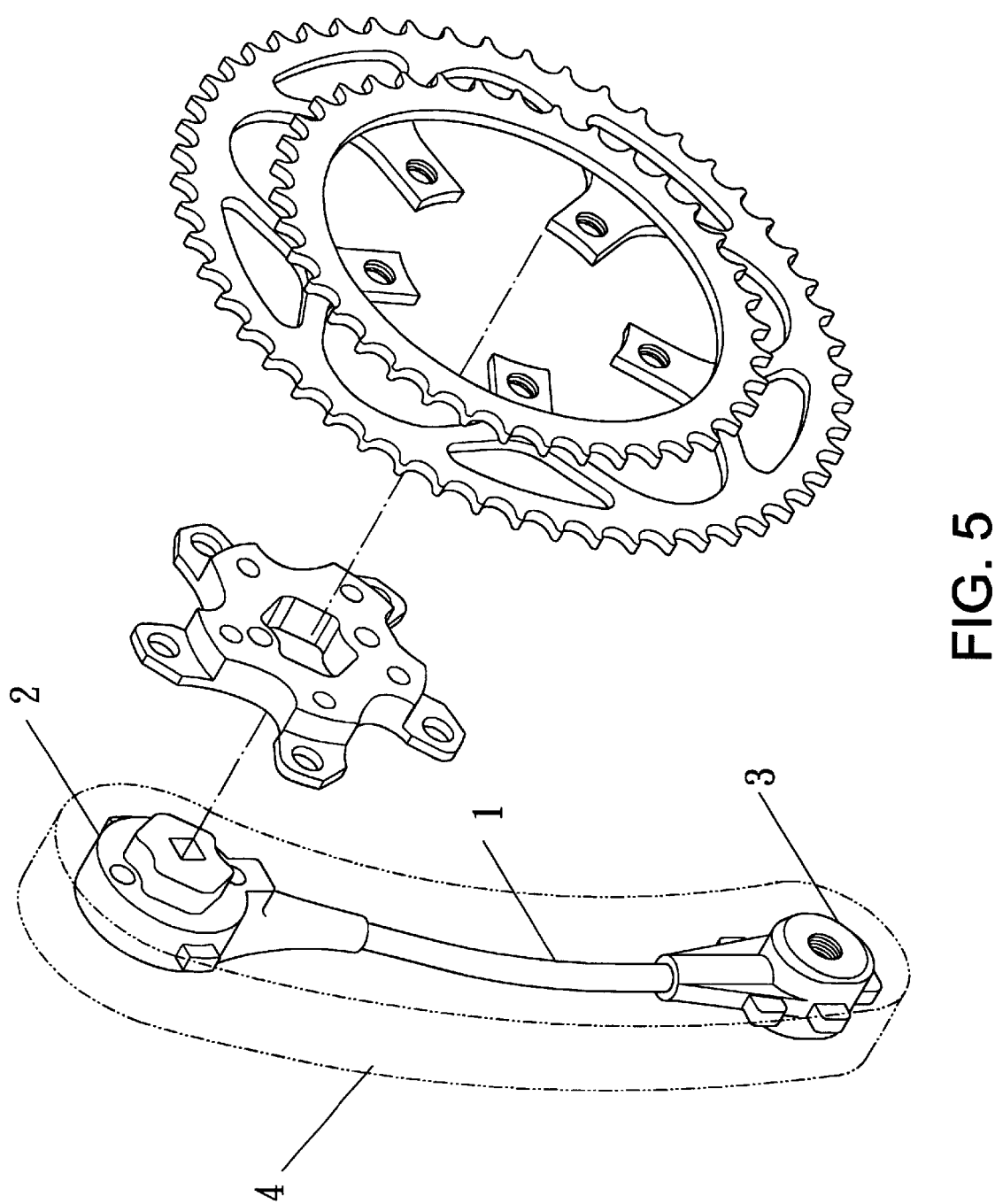
FIG. 5 shows a schematic view of the preferred embodiment of the present invention in conjunction with a chain ring.

As shown in FIGS. 2, 3A, and 3B, a bicycle crank arm embodied in the present invention comprises a main body 1, an axle fastening member 2, a pedal fastening member 3, and a cover body 4.

The main body 1 is of a rod-shaped construction and is provided at one end thereof with a first male threaded portion II and at other end thereof with a second male threaded portion 12.

The axle fastening member 2 is provided at one end thereof with a female threaded portion 21, and in the external surface thereof with a plurality of protrusions 22. The axle fastening member 2 is fastened with the main body 1 such that the female threaded portion 21 is engaged with the first male threaded portion 11 of the main body.

The pedal fastening member 3 is provided at one end thereof with a female threaded portion 31, and in the external surface thereof with a plurality of protrusions 32. The pedal fastening member 3 is fastened with the main body 1 such that the female threaded portion 31 of the pedal fastening member 3 is engaged with the second male threaded portion 12 of the main body 1.

The cover body 4 is made of a carbon fiber material. The main body 1, the axle fastening member 2, and the pedal fastening member 3 are embedded in the cover body 4 such that the protrusions 22 of the axle fastening member 2 and the protrusions 32 of the pedal fastening member 3 are anchored in the cover body 4. The cover body 4 serves to hold the main body 1, the axle fastening member 2, and the pedal fastening member 3 together.

The embodiment of the present invention described above is to be regarded in all respects as being merely illustrative and not restrictive. Accordingly, the present invention may be embodied in other specific forms without deviating from the spirit thereof. The present invention is therefore to be limited only by the scope of the following appended claim.

What is claimed is:

1. A bicycle crank arm comprising:

a rod-shaped main body having first and second ends;

an axle fastening member fastened to the first end of said main body;

a pedal fastening member fastened to the second end of said main body; and a cover body made of a carbon fiber material encasing all of said main body, said axle fastening member, and said pedal fastening member;

said main body is provided at its first end with a first male threaded portion, and at the second end thereof with a second male threaded portion;

said axle fastening member is provided with a female threaded portion which is engaged with the first male threaded portion of the main body, said axle fastening member includes an external surface with a plurality of protrusions that are anchored to the cover body; and the pedal fastening member is provided with a female threaded portion which is engaged with second male threaded portion of the main body, and the pedal fastening member includes an external surface with a plurality of protrusions that are anchored to the cover body.

* * * * *